(12) United States Patent
Kabbani et al.

(10) Patent No.: US 9,455,870 B1
(45) Date of Patent: Sep. 27, 2016

(54) ACHIEVING BALANCED INTERCONNECTIVITY IN A COMPUTER NETWORK

(71) Applicant: Google Inc., Mountain View, CA (US)

(72) Inventors: Abdul Kabbani, Los Gatos, CA (US); Amin Vahdat, Los Altos, CA (US)

(73) Assignee: Google Inc., Mountain View, CA (US)

( * ) Notice: Subject to any disclaimer, the term of this patent is extended or adjusted under 35 U.S.C. 154(b) by 598 days.

(21) Appl. No.: 13/921,578

(22) Filed: Jun. 19, 2013

(51) Int. Cl.
*G06F 15/177* (2006.01)
*H04L 12/24* (2006.01)

(52) U.S. Cl.
CPC ............................... *H04L 41/0823* (2013.01)

(58) Field of Classification Search
None
See application file for complete search history.

(56) References Cited

U.S. PATENT DOCUMENTS 5,999,288 A * 12/1999 Ellinas ................ H04J 14/0227
398/59
7,693,061 B2 * 4/2010 El-Sakkout ............. H04W 3/66
709/241

OTHER PUBLICATIONS

Santi, Paolo. "Topology Control in Wireless Ad Hoc and Sensor Networks." ACM Computing Surveys. vol. 37, No. 2. Jun. 2005. pp. 164-194.*

* cited by examiner

*Primary Examiner* — Jeffrey R Swearingen
(74) *Attorney, Agent, or Firm* — McDermott Will & Emery (57) ABSTRACT

Systems and methods of configuring a computer network are provided. N network nodes can each form M communication links with other network nodes. A number of communication links equal to the largest integer not greater than the quotient of M divided by (N−1) can be assigned between each pair of network nodes. The remaining communication links can be assigned such that a graph represented by the network nodes and communication links is substantially geometrically symmetric.

15 Claims, 13 Drawing Sheets

ACHIEVING BALANCED INTERCONNECTIVITY IN A COMPUTER NETWORK

BACKGROUND

Cloud computing and its applications are effecting a qualitative shift in the way people communicate and share information. The underlying computer networks that support cloud computing can be divided into two major categories: intra-datacenter and inter-datacenter. Intra-datacenter networks interconnect the computing infrastructure (servers, disks) within the same building or among different buildings of a datacenter campus; inter-datacenter networks connect multiple datacenters distributed at different geographic locations. Many modern high-speed data links use optical transmission technologies via optical fibers for both intra- and inter-datacenter networks.

SUMMARY OF THE INVENTION

Aspects and implementations of the present disclosure are directed to systems and methods for achieving balanced interconnectivity in a computer network.

At least one aspect is directed to a computer-implemented method for configuring a network. The method can include providing N network nodes. Each network node can form M communication links with other network nodes. The method can include assigning, between each pair of network nodes, a number of communication links equal to the largest integer not greater than the quotient of M divided by (N−1). The method can include assigning the remaining communication links such that a graph represented by the network nodes and communication links is substantially geometrically symmetric.

At least one aspect is directed to a system for configuring a network. The system can include a data processing system having at least one of a topology analysis module, a network configuration module, and a configuration dissemination module. The data processing system can be configured to provide N network nodes. Each network node can form M communication links with other network nodes. The data processing system can be configured to assign, between each pair of network nodes, a number of communication links equal to the largest integer not greater than the quotient of M divided by (N−1). The data processing system can be configured to assign the remaining communication links such that a graph represented by the network nodes and communication links is substantially geometrically symmetric.

At least one aspect is directed to a non-transitory computer readable storage medium having instructions encoded thereon which, when executed by a processor, cause the processor to perform a method for configuring a network. The method can include providing N network nodes. Each network node can form M communication links with other network nodes. The method can include assigning, between each pair of network nodes, a number of communication links equal to the largest integer not greater than the quotient of M divided by (N−1). The method can include assigning the remaining communication links such that a graph represented by the network nodes and communication links is substantially geometrically symmetric.

These and other aspects and embodiments are discussed in detail below. The foregoing information and the following detailed description include illustrative examples of various aspects and embodiments, and provide an overview or framework for understanding the nature and character of the claimed aspects and embodiments. The drawings provide illustration and a further understanding of the various aspects and embodiments, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing.

DESCRIPTION OF CERTAIN ILLUSTRATIVE IMPLEMENTATIONS

Following below are more detailed descriptions of various concepts related to, and implementations of, systems and methods for achieving balanced interconnectivity in a computer network. The various concepts introduced above and discussed in greater detail below may be implemented in any of numerous ways, as the described concepts are not limited to any particular manner of implementation. Examples of specific implementations and applications are provided primarily for illustrative purposes.

Figure 1:
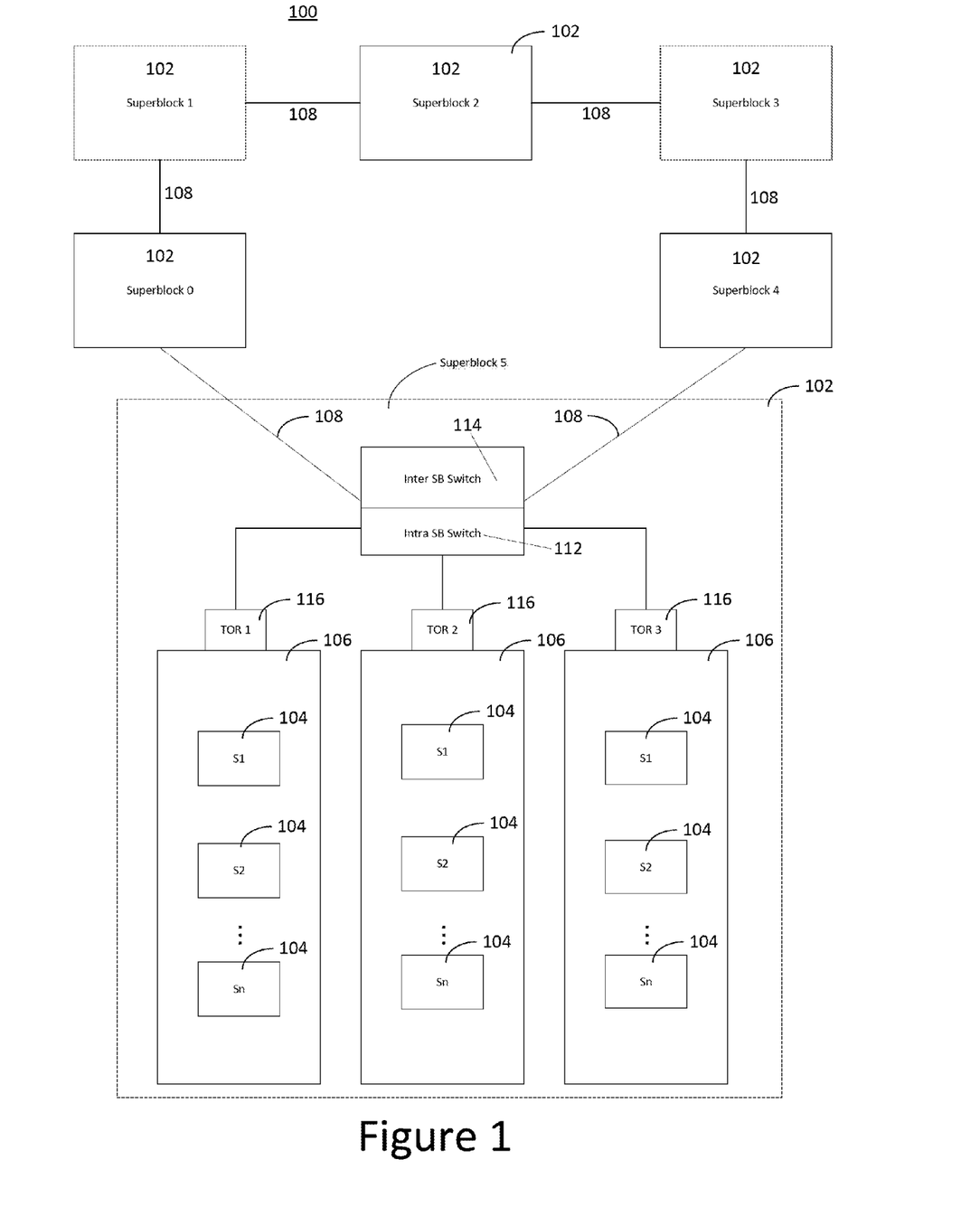
FIG. 1 is a diagram of a data center, according to an illustrative implementation.

FIG. 1 is a block diagram of an example data center 100. The data center 100 includes several interconnected superblocks 102 (also referred to as "pods"). Each superblock 102 may include many hundreds, and in some implementations over one thousand, servers 104 arranged in server racks 106. The superblocks 102 are communicatively coupled to one another by optical and/or electrical communication links 108. Each superblock 102 includes an intra-superblock switch 112 for routing communications among the racks 106 included in the superblock 102 or to an inter-superblock block switch 114, which routes data communications between superblocks 102. An inter-superblock switch 114 may include any number of network ports for sending and receiving data from other superblocks 102 in the data center 100. Each network port can support a communication link, for example by connecting to an Ethernet cable, fiber optic cable, or any other means for data transmission. While the data center 100 is shown with six superblocks 102, it should be appreciated that any number of superblocks 102 may be included in the data center 100, and that each superblock may include any number of communication links 108 to other superblocks 102 in the data center 100.

As indicated above, each superblock 102 includes a large number of servers 104. In some implementations, a superblock 102 may include hundreds or more than one thousand servers. The servers 104 are arranged in server racks 106. A top-of-rack switch 116 routes data communications between servers 104 within a given rack 106 and from servers within the rack to the intra-superblock switch 112. In some implementations, the intra-superblock switch 112 may include multiple switches arranged in a hierarchical fashion.

Each server 104 includes at least one processor, a memory, and a network interface card (NIC), coupled to one another via a data bus. The processor executes computer executable instructions stored in the memory to implement a wide variety of applications and operations. In some implementations, the processor executes computer executable code associated with a hypervisor, also referred to as a virtual machine manager. As would be understood by a person of ordinary skill in the art, a hypervisor is an application that creates and manages virtual machines, providing the virtual machines with a virtual operating platform. The virtual machines, in turn, share the physical resources of the server 104, and execute a variety of applications in isolated environments instantiated by the hypervisor. Data communications originating from an application within a virtual machine to other physical or virtual machines are also managed by the hypervisor. The hypervisor directs communications to off-server devices or virtual machines to the NIC, which the hypervisor controls in part through a NIC driver module.

Fairness and throughput guarantees for communication between superblocks 102 in such a network can vary based on the configuration of links between the superblocks 102. For example, in some implementations the number of network ports on the inter-superblock switch 114 of each superblock 102 can be larger than the total number of superblocks 102 in the data center 100. Therefore, the data center 100 can be configured so that each superblock 102 is connected to each other superblock 102 by a common number of communication links. If, for each superblock 102, the number of network ports on the inter-superblock switch 114 is not a multiple of the number of other superblocks 102, there will still be unused network ports on the inter-superblock switch 114 after each superblocks 102 has been connected to all of the other superblocks 102 by a common number of communication links.

The communication links formed between the remaining unused ports of each inter-superblock switch 114 are referred to as the interconnectivity slack of the data center 100. Interconnectivity slack links may be allocated in a number of ways. However, some interconnectivity slack configurations may result in higher minimum throughput between superblocks 102 than other configurations. Systems and processes are disclosed that can configure a network switch as the data center 100 to achieve balanced interconnectivity between substantially all network nodes (e.g., superblocks 102). A network shared by data flows (e.g., the backlogged superblocks 102), is said to be balanced when the minimum inter-superblock connectivity across all superblock pairs is maximized. The inter-superblock connectivity should be as uniform as possible and the resulting topology should be as symmetric across all superblock pairs as possible. The concepts of balanced interconnectivity and symmetric network topologies are further illustrated below.

Figure 2:
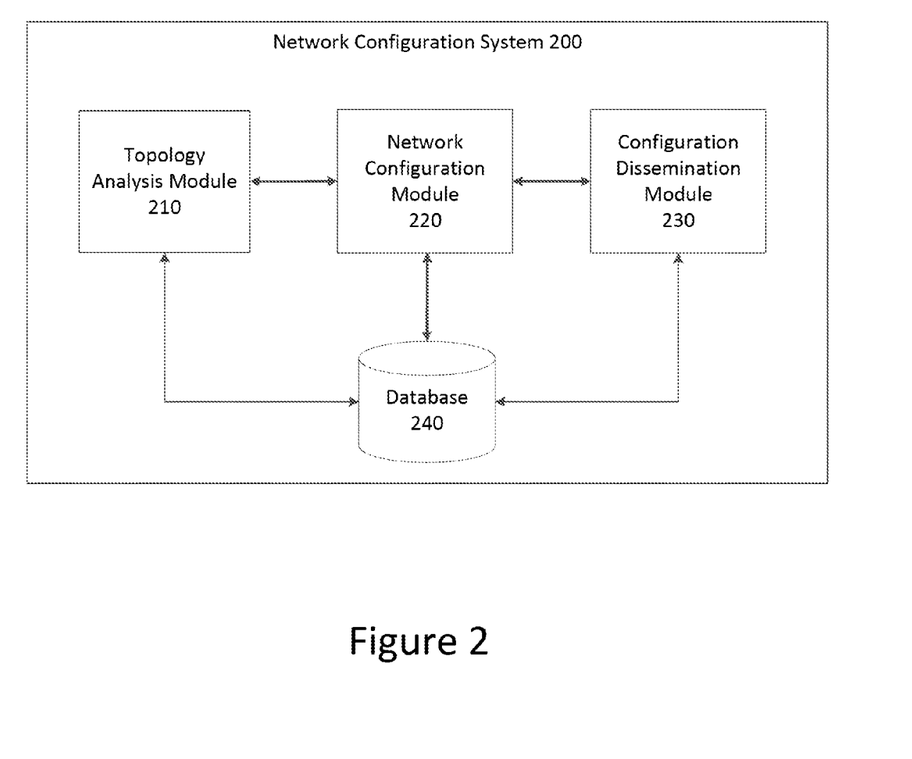
FIG. 2 is a block diagram of a network configuration system, according to an illustrative implementation.

FIG. 2 is a block diagram of a network configuration system 200, according to an illustrative implementation. The network configuration system 200 includes a topology analysis module 210, a network configuration module 220, a configuration dissemination module 230, and a database 240. The components of the network configuration system 200 work to determine initial parameters of a network, generate a network configuration, and disseminate the network configuration information. The configuration generated by the system 200 can help to achieve balanced interconnectivity among the nodes in the network, as discussed above. One exemplary process that can be executed by the system 200 to configure a network is described below in connection with FIG. 6.

In some implementations, the components of the network configuration system 200 can be implemented by special purpose logic circuitry, e.g., an FPGA (field programmable gate array) or an ASIC (application-specific integrated circuit). In other implementations, the components of the network configuration system 200 can be implemented by a general purpose processor. The components can also include, in addition to hardware, code that creates an execution environment for computer programs, e.g., code that constitutes processor firmware, a protocol stack, a database management system, an operating system, a cross-platform runtime environment, a virtual machine, or a combination of one or more of these.

The network configuration system 200 can implement methods to determine a configuration for a network such as the data center 100 shown in FIG. 1. For example, in some implementations, a network can be configured based on the number of nodes N (i.e., superblocks) in the network and the number of communication links M supported by each node (i.e., the number of network ports on each inter-superblock switch). The topology analysis module 210 can determine values for the parameters N and M to be used in such an algorithm. In some implementations, the computer network can include all of the superblocks in a data center, and the number N can represent the total number of superblocks to be included in the data center. The network configuration system 200 can be a computing device located within the data center or otherwise connected to the data center. The topology analysis module 210 can determine the number of superblocks, for example, by broadcasting a request to all superblocks in the data center and determining the total number of unique responses received from superblocks. In some implementations, the number N can then be stored in the database 240 for later retrieval.

The topology analysis module 210 can also determine the number of possible connections of each node in the network (M). For example, if at least one communication link connects all of the nodes in the network, the topology analysis module 210 can query the nodes by broadcasting a request. For example, the topology analysis module 210 can broadcast a request for superblocks to identify the type of switches used to implement the inter-superblock switch within each superblock. Based on the responses received, the topology analysis module 210 can determine the number of possible connections for each switch. For example, nodes may be identified by a manufacturer and model number, and the topology analysis module 210 can determine the number of ports associated with each particular node based on manufacturer descriptions. Such descriptions can be stored in the database 240, for example.

In instances where the topology analysis module 210 is not able to communicate directly with any of the network nodes, the topology analysis module 210 can instead determine the parameter values by retrieving them from the database 240. Alternatively, the topology analysis module 210 may receive configuration information for the network components as input from a human operator, and may assign parameter values as discussed above. All of the parameter values can then be stored in the database 240.

The network configuration module 220 can define the communication links between nodes in the network. For example, the network configuration module 220 can perform the steps of a configuration method, an example of which is described below in connection with FIG. 6. In some implementations, the network configuration module 220 can obtain the parameter values required for execution of the algorithm from the database 240, where they can be stored, for example, by the topology analysis module 210. In other implementations, the network configuration module 220 can obtain the parameter values directly from the topology analysis module 210.

The network configuration module 220 then performs the steps of the algorithm to determine the network links. For example, the network configuration module 210 can determine the quotient of M divided by (N−1). This quotient can be used to determine the number Q of communication links to be assigned between each pair of network nodes. The links formed from the remaining unused network ports are the interconnectivity slack, as defined above in connection with FIG. 1. The network configuration module 220 can then determine how to allocate interconnectivity slack links among the remaining unused network ports. In some implementations, the network configuration module 200 can configure the network so that the interconnectivity slack links are allocated in a balanced fashion.

The configuration dissemination module 230 can transmit the information corresponding to the network configuration determined by the network configuration module 220. For example, in some implementations the nodes in the network can be connected via dynamic optical links. The configuration dissemination module 230 can transmit the network configuration information to a controller, which can implement the network configuration by linking the nodes in the network according to the network configuration received from the configuration dissemination module 230. In some implementations, the controller can be an optical switch controller configured to optically link the selected network nodes. In other implementations, the configuration dissemination module 230 can transmit the network configuration to a human operator, for example by printing the network configuration information to a file. The human operator can then manually configure the network according to the network configuration received from the configuration dissemination module 230. Examples of networks whose interconnectivity slack is allocated in an unbalanced configuration, are provided below in connection with FIGS. 3A-5B. A process for achieving a balanced network and an example of a balanced network are then discussed in connection with FIGS. 6-7D.

Figure 3A:
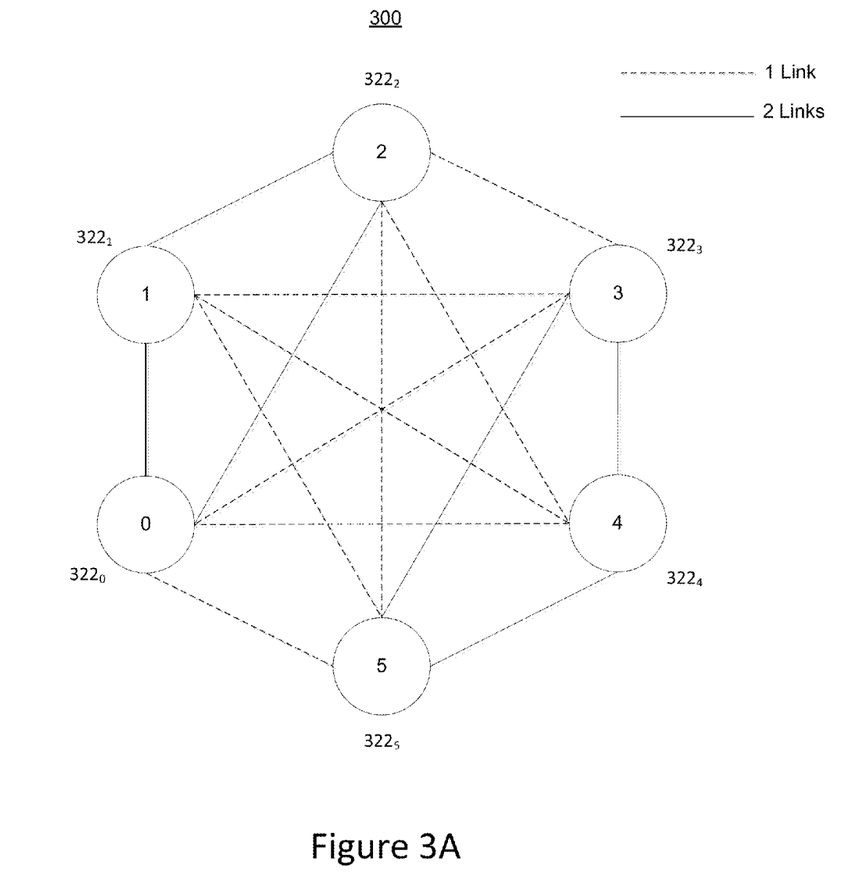
FIG. 3A is an example network whose links are assigned in an unbalanced fashion, according to an illustrative implementation.

FIG. 3A is an example network 300 whose links are assigned in an unbalanced fashion, according to an illustrative implementation. The network 300 includes six nodes $322_0$-$322_5$, generally referred to as nodes 322. Each of the nodes 322 is assigned a sequential integer index value beginning from 0. In some implementations, each node 322 in the network 300 represents a superblock in a data center, such as the superblocks 102 of the data center 100 shown in FIG. 1. Each node 322 includes seven communication links to other nodes 322 in the network 300. Communication links are shown by the lines interconnecting pairs of nodes 322 in the network 300. Because each node 322 supports more communication links than there are other nodes 322 in the network 300, there are some pairs of nodes 322 that are connected by more than one communication link. Dashed lines represent a single communication link, while solid lines represent two communication links. For example, node $322_0$ is connected to node $322_5$ by one communication link and to node $322_1$ by two communication links.

Each node 322 is connected by at least one link to each other node 322 in the network 300. The additional links, referred to as interconnectivity slack, are distributed in an unbalanced fashion, leading to suboptimal fairness and throughput characteristics of the network 300. The interconnectivity slack can be seen more clearly in FIG. 3B.

Figure 3B:
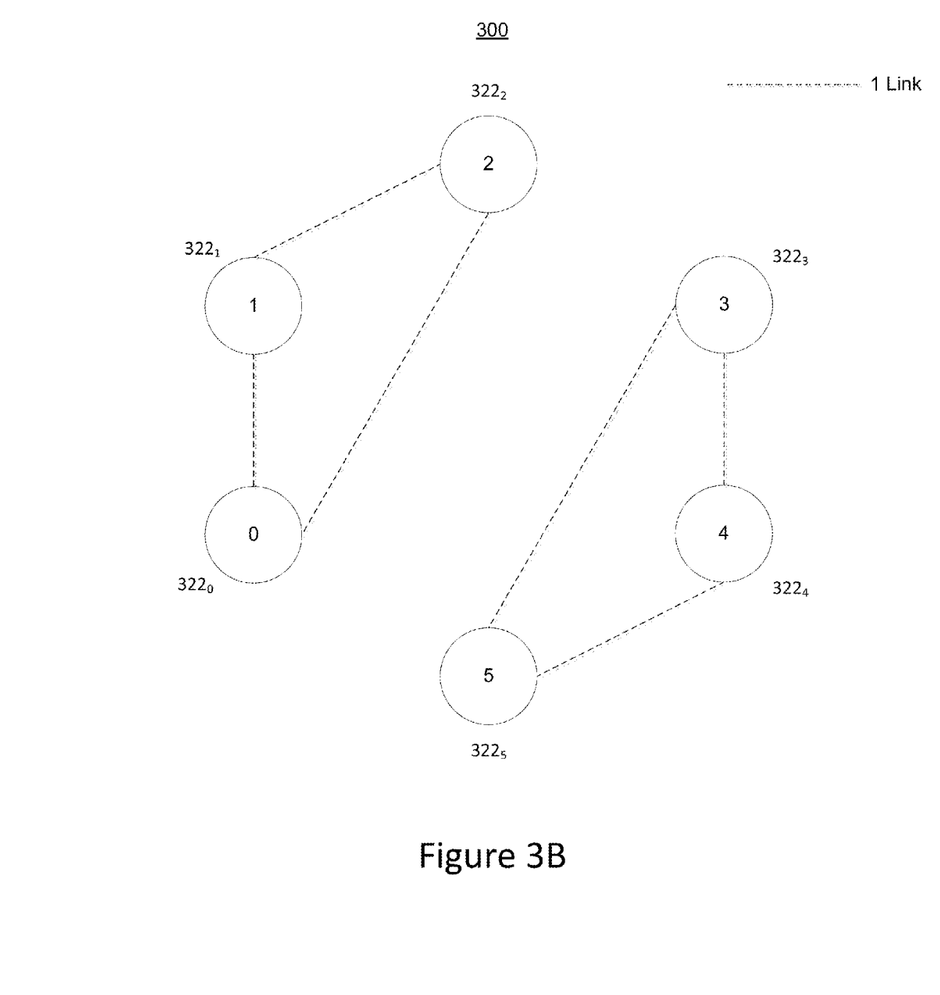
FIG. 3B shows the interconnectivity slack of the network shown in FIG. 3A, according to an illustrative implementation.

FIG. 3B shows the interconnectivity slack of the network 300 shown in FIG. 3A, according to an illustrative implementation. The network 300 is shown with a single link removed from every pair of nodes 322. The remaining links (i.e., the interconnectivity slack) allow additional network traffic to flow between some pairs of network nodes.

However, the interconnectivity slack shown in FIG. 3B is unbalanced. Additional network traffic can be routed between nodes 0, 1, and 2, or between nodes 3, 4, and 5. However, with the links shown, it is not possible to route additional traffic from any of nodes 0, 1, and 2 to nodes 3, 4, and 5. This is because the interconnectivity slack in the network 300 has been allocated in an unbalanced manner. For example, there are two additional paths for routing network traffic between nodes 0 and 1 (i.e., the direct path, and the path through node 2), but there is no additional path for routing traffic between nodes 0 and 3. It can therefore be said that extra throughput capacity has been allocated to nodes 0 and 1 at the expense of throughput capacity between nodes 0 and 3, due to the unbalanced configuration of the network 300.

Figure 4A:
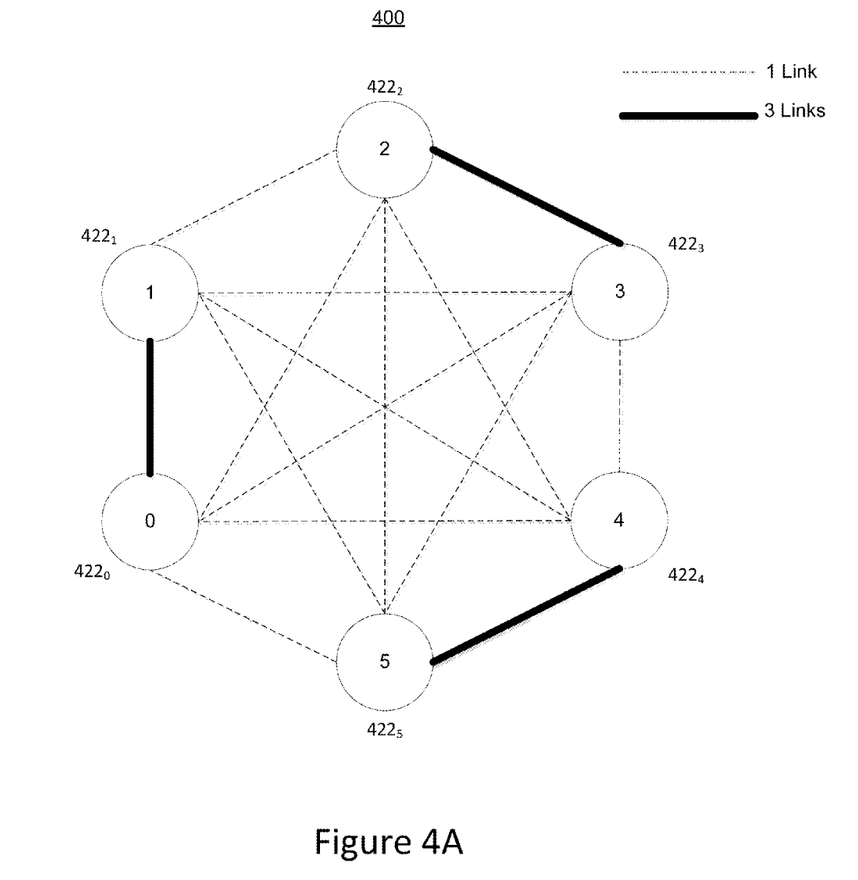
FIG. 4A is another example network whose links are assigned in an unbalanced fashion, according to an illustrative implementation.

FIG. 4A is another example network 400 whose links are assigned in an unbalanced fashion, according to an illustrative implementation. Like the network 300 shown in FIGS. 2A and 2B, the network 400 includes six nodes $422_0$-$422_5$, generally referred to as nodes 422. Each of the nodes 422 is assigned a sequential integer index value beginning from 0. The nodes 422 each support seven communication links. The primary difference between the network 400 and the network 300 is the allocation of the communication links.

Dashed lines again represent a single communication link between nodes 422, while bold lines represent three communication links. Each pair of nodes 422 is connected by at least one communication link. The additional remaining links (i.e., the interconnectivity slack) are illustrated in FIG. 4B.

Figure 4B:
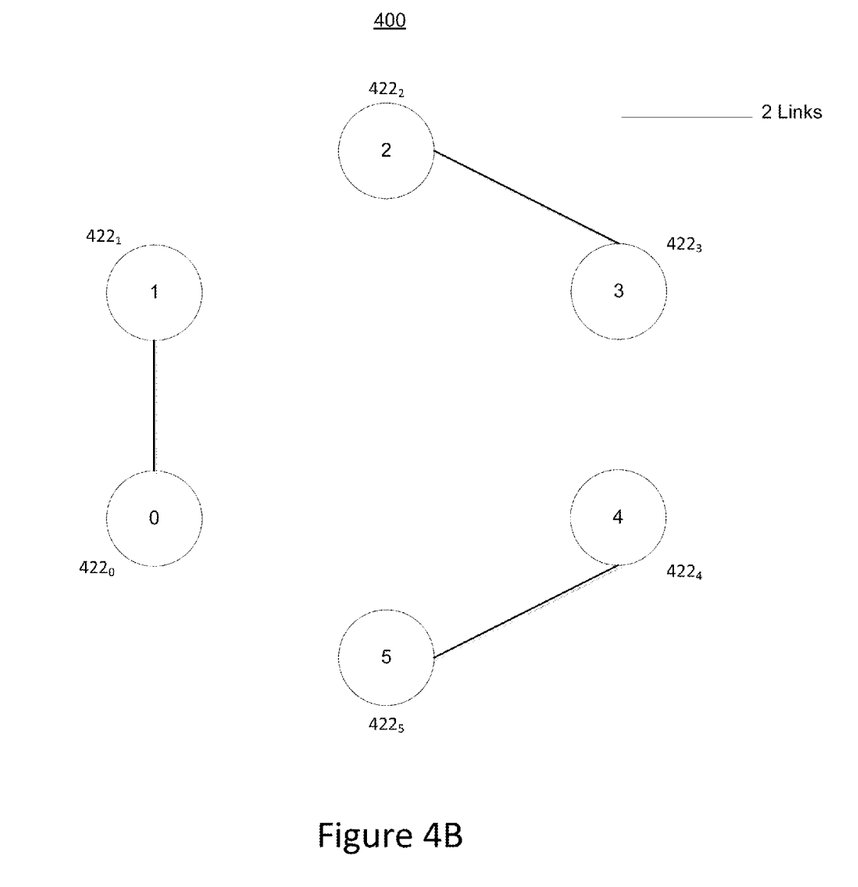
FIG. 4B shows the interconnectivity slack of the network shown in FIG. 4A, according to an illustrative implementation.

FIG. 4B shows the interconnectivity slack of the network 400 shown in FIG. 4A, according to an illustrative implementation. A single communication link has been removed from each pair of nodes 422 to more clearly illustrate the interconnectivity slack in the network 400. A solid line between a pair of nodes 422 represents two additional communication links. As can be seen from in FIG. 4B, additional network traffic can be routed between nodes 0 and 1, nodes 2 and 3, and nodes 4 and 5. In fact, each of those three pairs includes two additional slack communication links. However, there are several other node pairs that are not connected by any slack links (e.g., nodes 0 and 2 have no slack links connecting them). As is the case in the network 300 shown in FIG. 3, the communication links in the network 400 have been assigned in an unbalanced way, which results in unfair network throughput. Rearranging the communication links in a balanced way can help to overcome this problem.

Figure 5A:
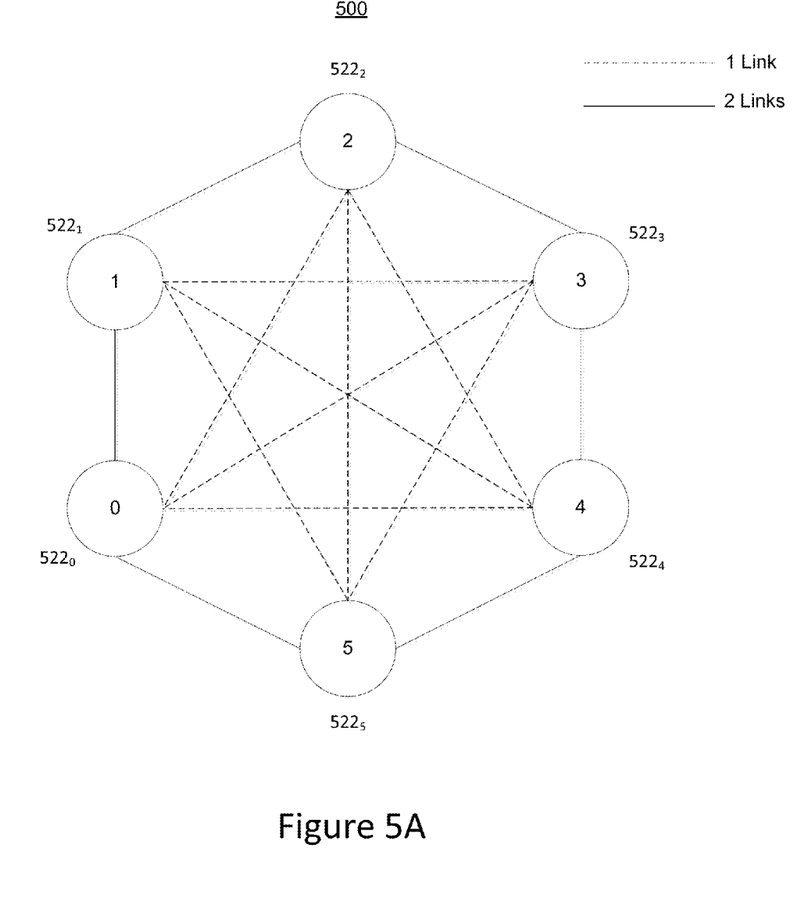
FIG. 5A is an example network whose links are assigned in a balanced fashion, according to an illustrative implementation.

FIG. 5A is an example network 500 whose links are assigned in a balanced fashion, according to an illustrative implementation. Like the networks 300 and 400 shown in FIGS. 2A-2B and 3A-3B, respectively, the network 500 includes six nodes $522_0$-$522_5$, generally referred to as nodes 522. Each of the nodes 522 is assigned a sequential integer index value beginning from 0. The nodes 522 each support seven communication links. Dashed lines represent a single communication link between nodes 522, while solid lines represent two communication links. Each pair of nodes 522 is connected by at least one communication link. The additional remaining links (i.e., the interconnectivity slack) are illustrated in FIG. 5B.

Figure 5B:
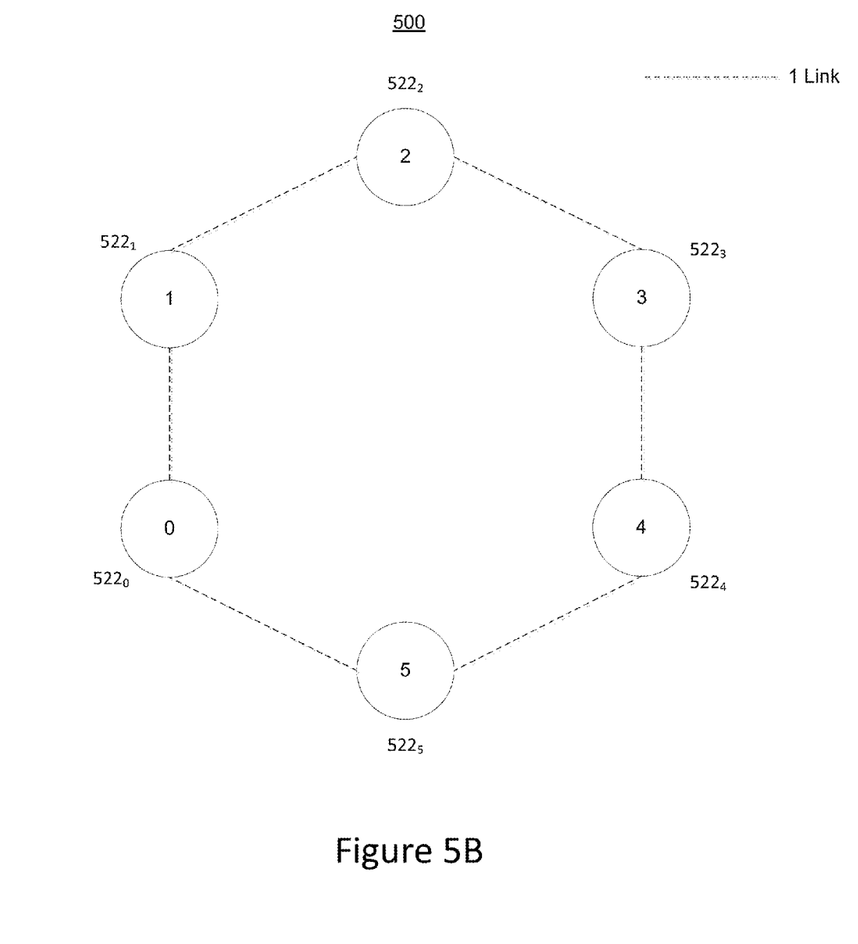
FIG. 5B shows the interconnectivity slack network shown in FIG. 5A, according to an illustrative implementation.

FIG. 5B shows the interconnectivity slack of the network 500 shown in FIG. 5A, according to an illustrative implementation. A single link from each pair of nodes 522 has been removed, so that only the interconnectivity slack remains visible. Additional network traffic can be routed between any pair of nodes, because the interconnectivity slack in the network 500 forms a connected graph. Therefore, the network 500 is capable of routing more simultaneous traffic than either the network 400 shown in FIGS. 3A and 3B or the network 300 shown in FIGS. 2A and 2B. Unlike in the network 400, in the network 500 the difference in the number of links connecting any two nodes 522 is never greater than one. Unlike the network 300, the network 500 is perfectly symmetric across all polygonal diameters. In this configuration, the minimum inter node connectivity across all node pairs is maximized in the network 500. Therefore, the network 500 is balanced.

Figure 6:
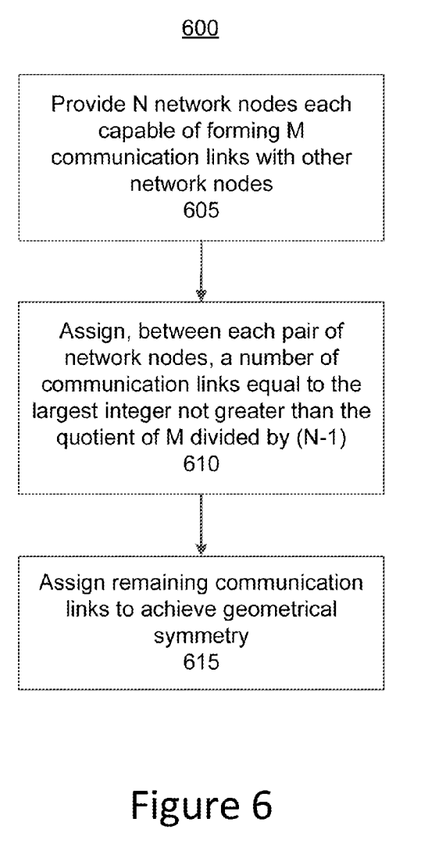
FIG. 6 is a flow diagram of a process for configuring a network, according to an illustrative implementation.

FIG. 6 is a flow diagram of a process 600 for configuring a network, according to an illustrative implementation. In brief overview, the process 600 includes providing N network nodes each capable of forming M communication links with other network nodes (Step 605), assigning, between each pair of network nodes, a number of communication links equal to the largest integer not greater than the quotient of M divided by (N−1) (Step 610), and assigning the remaining communication links to achieve geometrical symmetry (Step 615). The process 600 can be carried out, for example, by the network control system 200 shown in FIG. 2.

The process 600 includes providing N network nodes each capable of forming M communication links with other network nodes (Step 605). For example, the network nodes can be the set of superblocks in a data center or the inter-superblock switches connecting each superblock as described above in connection with FIG. 1. The network nodes can include network ports allowing them to be communicatively coupled to one another. In some implementations, the number of network ports available on each network node can be equal to M. In some other implementations, the network nodes can communicate wirelessly.

The process 600 also includes assigning, between each pair of network nodes, a number of communication links equal to the largest integer not greater than the quotient of M divided by (N−1) (Step 610). Assigning a link between a pair of nodes can be achieved by connecting a network port on each of the nodes, for example with an Ethernet cable, so that the nodes are communicatively coupled. In some implementations, the nodes can communicate wirelessly, and assigning a link between two nodes can include configuring the nodes to transmit and receive information from one another. In some other implementations, the network can include a dynamic optical switch connected to the network nodes. Communication links can be assigned between two selected nodes by configuring the switch to communicatively couple the two nodes. Assigning links in this manner allows each network node to be connected to each other network node by Q network links, where Q is the highest common number of communication links that can be formed from one node to each other node.

The network nodes may still have unused network ports after Q links have been assigned (Step 610) between every pair of nodes in the network. Although the number of remaining unused network ports will not be sufficient to connect each node to each other nodes, additional communication links can be formed between the unused ports to increase the average throughput between nodes in the network. These additional communication links are the links referred to as the interconnectivity slack in the discussion of FIGS. 2B, 3B, and 4B above. The interconnectivity slack links are assigned in a subsequent step of the process 600.

The process 600 includes assigning the remaining communication links (i.e., the interconnectivity slack links) such that a graph represented by the network nodes and communication links is substantially geometrically symmetrical (Step 615). In the graph, the network nodes are represented as vertices, and the communication links are represented as edges. Geometrical symmetry can result in a more balanced network, which leads to higher guaranteed throughput and increased routing fairness, as discussed above. In some implementations (i.e., when M is a multiple of N−1), there may be no remaining communication links to assign in this step.

If the number of remaining communication links (i.e., unused network ports) for each node is odd, geometrical symmetry can be achieved by first connecting the diameters of the graph by assigning communication links between each pair of nodes represented by opposite vertices in the graph. Opposite vertices of the graph are those vertices separated from one another by the largest possible geometric distance. Linking the diameters of the graph is therefore an efficient way to increase bandwidth in the network, because it creates an additional direct communication link between network nodes that are separated by a large distance. Opposite vertices are connected by a single communication link in this step, so connecting each diameter uses one of the remaining unused ports for each node. Therefore, after connecting the diameters of the graph, there will be an even number of communication links remaining. In some implementations, there may be zero communication links remaining.

Having reduced the number of remaining communication links for each node to an even number, geometrical symmetry can be achieved by assigning the even number of remaining communication links for each node in pairs. For example, for respective each node, the first pair of remaining communication links can be assigned to the two nearest nodes (i.e., nodes corresponding to the nearest neighbors of the respective node in the graph). If there are additional remaining communication links for the respective node, another pair of communication links can be assigned between the respective node and its second nearest neighbors. Remaining communication links for the respective node can continue to be assigned in pairs to the next closest nodes until all of the remaining communication links have been assigned. The result is a balanced network in which the minimum inter-node connectivity across all node pairs is maximized.

Figure 7A:
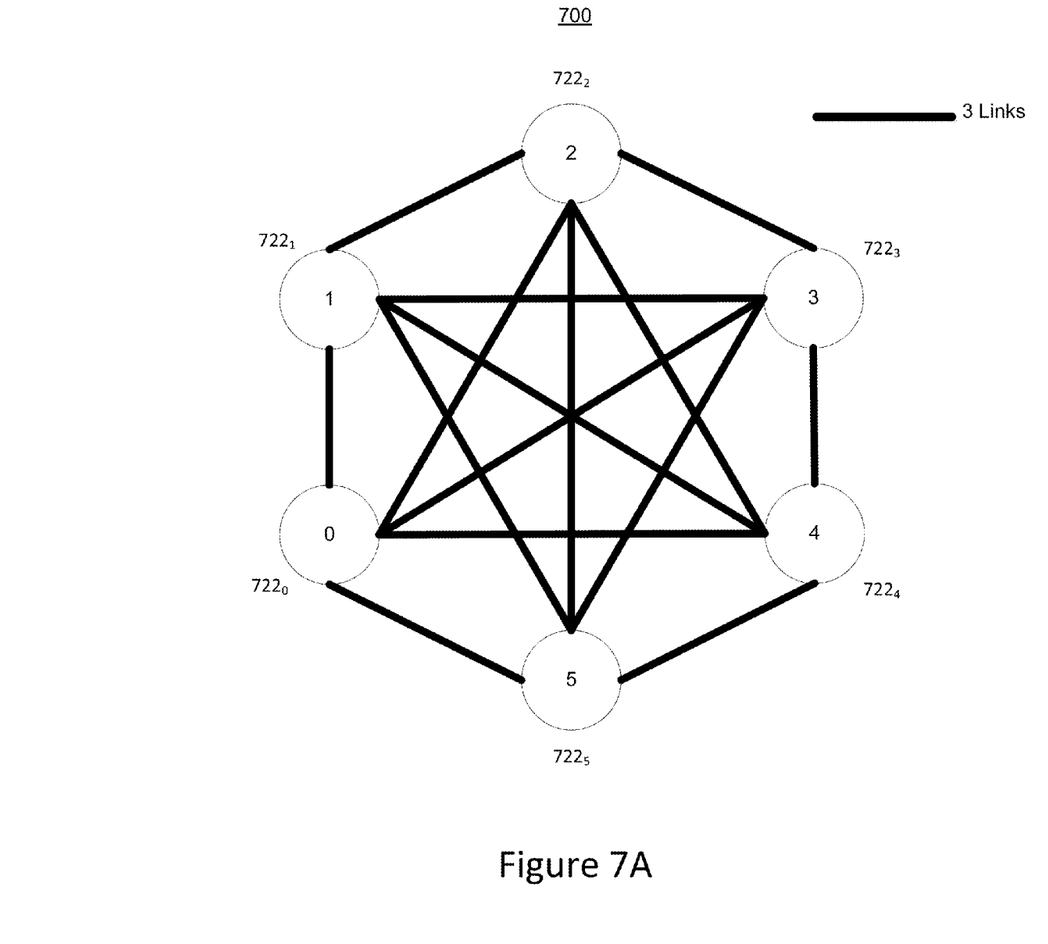
FIG. 7A is an example of a balanced network after a first configuration step, according to an illustrative implementation.

FIG. 7A is an example of a balanced network 700 after a first configuration step, according to an illustrative implementation. The network 700 includes six nodes $722_0$-$722_5$, generally referred to as nodes 722. Each of the nodes 722 is assigned a sequential integer index value beginning from 0. In some implementations, each node 722 in the network 700 represents a superblock in a data center, such as the superblocks 102 of the data center 100 shown in FIG. 1.

Each node 722 includes 18 communication links to other nodes 722 in the network 700. Therefore, using the variables introduced above, N (the number of nodes 722 in the network 700) is equal to six and M (the number of communication links to each node 722) is equal to 18. The first step in creating a balanced network, as depicted in FIG. 7A, is to connect each node 722 to each other node 722 with a number of communication links equal to the largest integer not greater than M divided N−1. Thus, each node 722 is connected to each other node 722 by: floor(18/(6−1))=floor (3.6)=3 communication links. Communication links are shown by the lines interconnecting pairs of nodes 722 in the network 700.

Figure 7B:
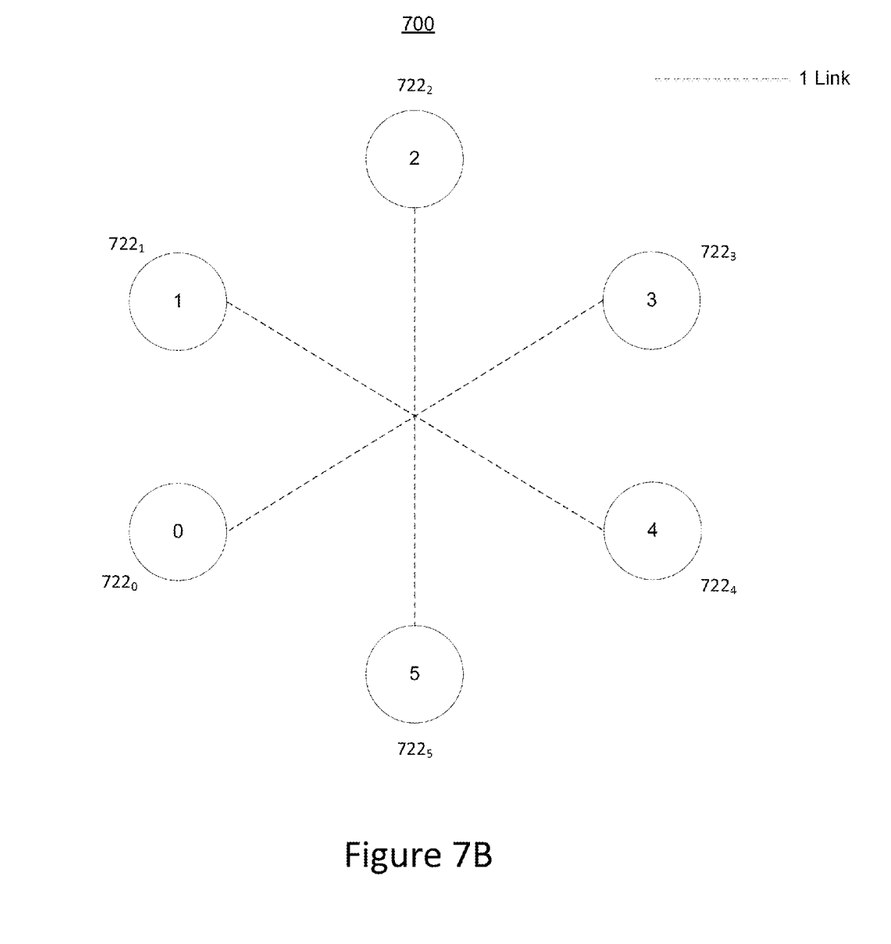
FIG. 7B is an example of the balanced network of FIG. 7A after a second configuration step, according to an illustrative implementation.

FIG. 7B is an example of the balanced network 700 of FIG. 7A after a second configuration step, according to an illustrative implementation. As shown in FIG. 7A, each node 722 has already been assigned 15 communication links, i.e. three links to each of the other five nodes in the network, and the total number of communication links for each node is 18. Therefore, there are three remaining communication links for each node. The number of communication links remaining for each node is odd, so the next step, shown in FIG. 7B, is to assign communication links along the diameters of the network 700. Therefore, communication links are assigned between nodes 0 and 3, nodes 1 and 4, and nodes 2 and 5. For illustrative purposes, the communication links assigned in the previous step shown in FIG. 7A are omitted from FIG. 7B.

Figure 7C:
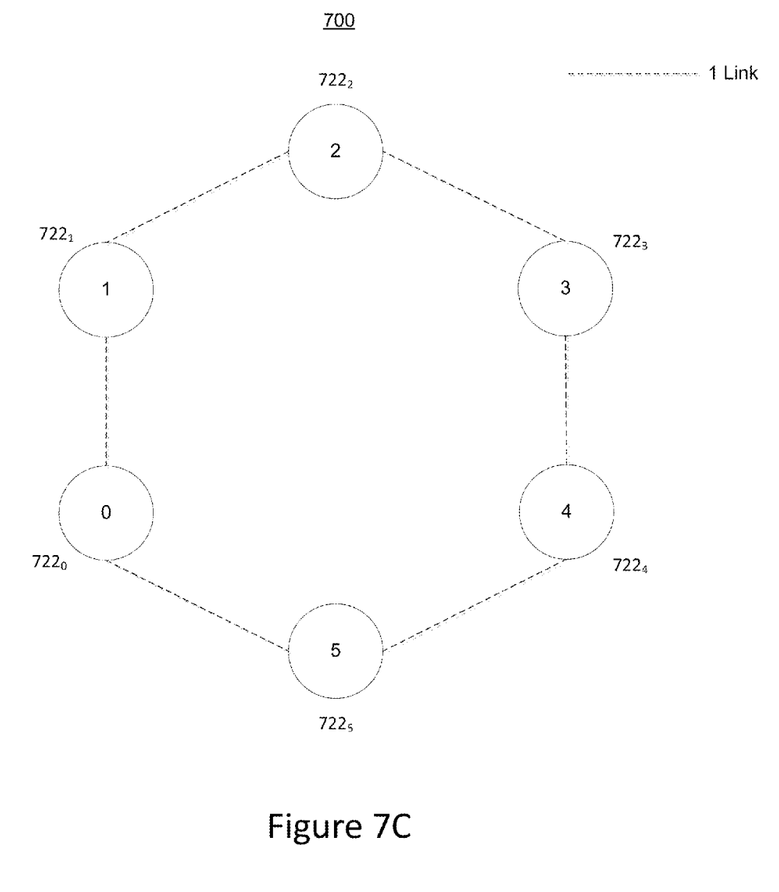
FIG. 7C is an example of the balanced network of FIG. 7A after a third configuration step, according to an illustrative implementation.

FIG. 7C is an example of the balanced network 700 of FIG. 7A after a third configuration step, according to an illustrative implementation. After connecting the diameters of the network 700, there are two communication links remaining for each node 722. These links are assigned to the nearest nodes (i.e., to the adjacent nodes of each respective node), resulting in the links depicted in the graph shown in FIG. 7C. For illustrative purposes, the communication links assigned previously are not visible in FIG. 7C. Having assigned the two remaining communication links for each node 722, the process of configuring the network 700 is complete.

Figure 7D:
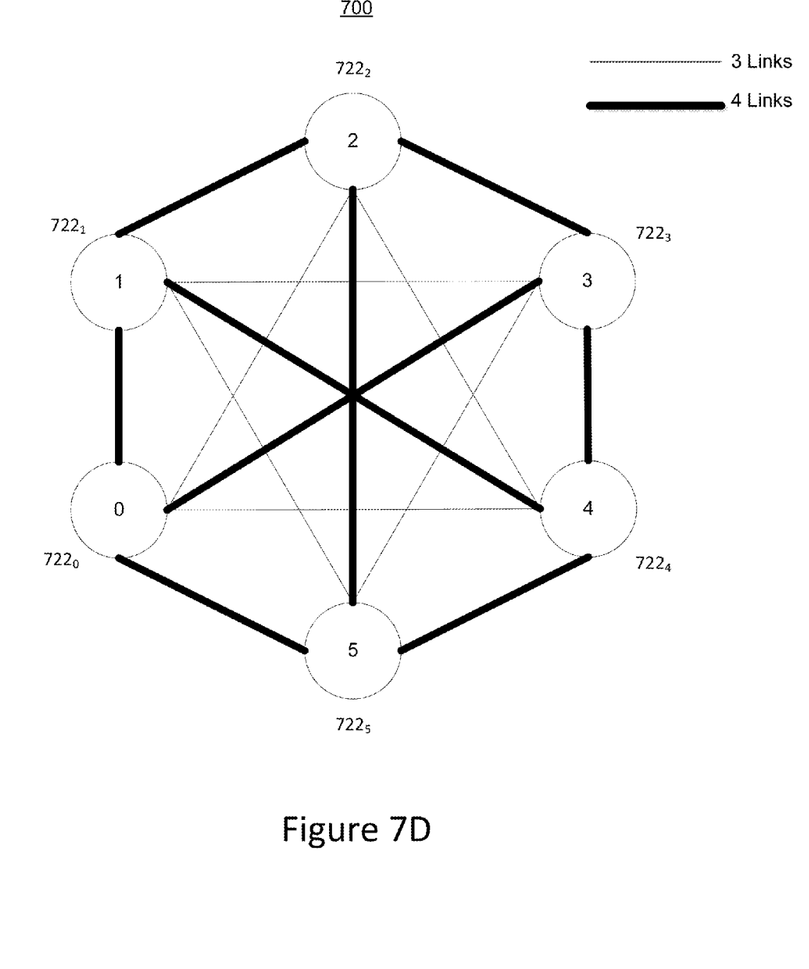
FIG. 7D is an example of the balanced network of FIG. 7A after a final configuration step, according to an illustrative implementation.

FIG. 7D is an example of the balanced network 700 of FIG. 7A after a final configuration step, according to an illustrative implementation. The network 700 is shown in its entirety. The view shown in FIG. 7D is a combination of all of the communication links shown in FIGS. 7A-7C. Thinner lines indicate three communication links, while thicker lines indicate four communication links. As discussed above, the network 700 is balanced because it exhibits symmetry across all of its diameters and the maximum difference in the number of communication links interconnecting any pair of nodes 722 is one. The minimum inter node connectivity across all nodes 722 is therefore maximized by the configuration of the network 700 shown in FIG. 7D.

What is claimed is:

1. A computer-implemented method for configuring a network comprising N network nodes, each network node able to form M communication links with other network nodes, the method comprising:
    conducting an initial link assignment by assigning, between each pair of network nodes, a number of communication links equal to the largest integer not greater than the quotient of M divided by (N−1);
    after the initial link assignment, assigning remaining unassigned communication links of the M communication links for each network node based on a geometry of a graph representing the network nodes and communication links, wherein assigning the remaining unassigned communication links further comprises:
        if the number of remaining unassigned communication links for each node is odd,
            assigning additional communication links representing diameters of the graph, and
            after assigning the additional communication links representing the diameters of the graph, if there are still unassigned communication links, assigning communication links between pairs of adjacent nodes in the graph; and
        if the number of remaining unassigned communication links for each node is even, assigning communication links between pairs of adjacent nodes in the graph; and
    controlling a plurality of physical dynamic network switches to form physical links between the network nodes according to configuration information corresponding to the assignment of communication links.

2. The computer-implemented method of claim 1, wherein the method assigns communication links such that the maximum difference between the number of communication links assigned to any pair of network nodes is one.

3. The computer-implemented method of claim 1, wherein M is an even number.

4. The computer-implemented method of claim 1, wherein each pair of network nodes is connected by the same number of communication links.

5. The computer-implemented method of claim 1, further comprising disseminating the communication link assignments to a dynamic optical switch coupled to the network nodes.

6. A system for configuring a network comprising N network nodes, each network node able to form M communication links with other network nodes, the system comprising:
    a data processing system configured to:
        conduct an initial link assignment by assigning, between each pair of network nodes, a number of communication links equal to the largest integer not greater than the quotient of M divided by (N−1);
        after the initial link assignment, assign remaining unassigned communication links of the M communication links for each network node based on a geometry of a graph representing the network nodes and communication links, wherein the data processing system is further configured to:

if the number of remaining unassigned communication links for each node is odd,
assign additional communication links representing diameters of the graph, and
after assigning the additional communication links representing the diameters of the graph, if there are still unassigned communication links, assign communication links between pairs of adjacent nodes in the graph; and
if the number of remaining unassigned communication links for each node is even, assign communication links between pairs of adjacent nodes in the graph; and
control a plurality of physical dynamic network switches to form physical links between the network nodes according to configuration information corresponding to the assignment of communication links.

7. The system of claim 6, wherein the maximum difference between the number of communication links assigned to any pair of network nodes is one.

8. The system of claim 6, wherein M is an even number.

9. The system of claim 6, wherein each pair of network nodes is connected by the same number of communication links.

10. The system of claim 6, further comprising a dynamic optical switch coupled to the network nodes, wherein the data processing system is further configured to disseminate the communication link assignments to the dynamic optical switch.

11. A non-transitory computer readable storage medium having instructions encoded thereon which, when executed by a processor, cause the processor to perform a method for configuring a network comprising N network nodes, each node able to form M communication links with other network nodes, the method comprising:
conducting an initial link assignment by assigning, between each pair of network nodes, a number of communication links equal to the largest integer not greater than the quotient of M divided by (N−1);
after the initial link assignment, assigning remaining unassigned communication links of the M communication links for each network node based on a geometry of a graph representing the network nodes and communication links, wherein assigning the remaining unassigned communication links further comprises:
if the number of remaining unassigned communication links for each node is odd,
assigning additional communication links representing diameters of the graph, and
after assigning the additional communication links representing the diameters of the graph, if there are still unassigned communication links, assigning communication links between pairs of adjacent nodes in the graph; and
if the number of remaining unassigned communication links for each node is even, assigning communication links between pairs of adjacent nodes in the graph; and
controlling a plurality of physical dynamic network switches to form physical links between the network nodes according to configuration information corresponding to the assignment of communication links.

12. The non-transitory computer readable storage medium of claim 11, wherein the instructions, when executed by the processor, cause the processor to assign communication links such that the maximum difference between the number of communication links assigned to any pair of network nodes is one.

13. The non-transitory computer readable storage medium of claim 11, wherein M is an even number.

14. The non-transitory computer readable storage medium of claim 11, wherein the instructions, when executed by the processor, cause the processor to assign communication links such that each pair of network nodes is connected by the same number of communication links.

15. The non-transitory computer readable storage medium of claim 11, wherein the instructions, when executed by the processor, cause the processor to disseminate the communication link assignments to a dynamic optical switch coupled to the network nodes.

* * * * *